United States Patent [19]

Potter

[11] Patent Number: 4,645,639

[45] Date of Patent: Feb. 24, 1987

[54] PUSHROD ASSEMBLY

[75] Inventor: Jerry D. Potter, Kennewick, Wash.

[73] Assignee: The United States of America as represented by the United States Department of Energy, Washington, D.C.

[21] Appl. No.: 595,231

[22] Filed: Mar. 30, 1984

[51] Int. Cl.$^4$ .................... G21C 21/00; F16D 11/04; B65B 1/04; B65B 5/10

[52] U.S. Cl. ............................ 376/260; 414/146; 53/244; 403/DIG. 1; 192/101; 192/143; 192/150; 376/261

[58] Field of Search ............... 376/260, 261; 414/146; 53/238, 244; 403/DIG. 1; 192/101, 143, 150

[56] References Cited

U.S. PATENT DOCUMENTS

| | | | |
|---|---|---|---|
| 1,075,441 | 10/1913 | Rekers | 192/143 |
| 1,719,231 | 7/1929 | McLaren | 310/103 |
| 2,824,638 | 2/1958 | DeBurgh | 198/619 |
| 2,893,530 | 7/1959 | Curtner | 192/150 |
| 2,943,216 | 6/1960 | Spodig | 310/103 |
| 3,306,076 | 2/1967 | Cashman et al. | 464/29 |
| 3,773,439 | 11/1973 | Sheridan | 417/415 |
| 3,837,232 | 9/1974 | Fredell et al. | 74/142 |
| 3,967,790 | 7/1976 | Hess | 242/67.2 |
| 4,233,115 | 11/1980 | Jacquelin | 376/233 |
| 4,292,788 | 10/1981 | King | 53/500 |

FOREIGN PATENT DOCUMENTS 2740979  3/1979  Fed. Rep. of Germany.

Primary Examiner—John F. Terapane
Assistant Examiner—Eric Jorgensen
Attorney, Agent, or Firm—Edward W. Nypaver; Robert Southworth, III; Judson R. Hightower

[57] ABSTRACT

A pushrod assembly including a carriage mounted on a shaft for movement therealong and carrying a pushrod engageable with a load to be moved. A magnet is mounted on a supporting bracket for movement along such shaft. Means are provided for adjustably spacing said magnet away from said carriage to obtain a selected magnetic attractive or coupling force therebetween. Movement of the supporting bracket and the magnet carried thereby pulls the carriage along with it until the selected magnetic force is exceeded by a resistance load acting on the carriage.

6 Claims, 3 Drawing Figures

PUSHROD ASSEMBLY

The United States Government has rights in this invention pursuant to contract DE-AC06-76FF02170 between the U.S. Department of Energy and Westinghouse Electric Corporation.

BACKGROUND OF THE INVENTION

This invention relates generally to the fabrication of fuel pin elements employed in nuclear reactors and, more particularly, to a magnetic pushrod assembly for moving stacked fuel pellets and the like between workstations.

The reactor core of a typical nuclear reactor generally contains a multiplicity of similarly constructed and interchangeable fuel assemblies vertically oriented in a side-by-side relation. Each fuel assembly, in turn, contains a multiplicity of thin, elongated fuel elements or pins, each comprised of a thin-walled tube or cladding containing a suitable fissionable material, such as plutonium, uranium and/or thorium for example, in the form of cylindrical fuel pellets stacked end-to-end therein. Also, a number of so called "cold components", such as tag gas capsules, reflectors, springs, spacers and the like, are enclosed within the cladding behind the fuel pellets.

Various methods are known for handling these loose stacks of fuel pellets and cold components and ultimately loading them into the cladding of a fuel pin. Special safeguards must be practiced when moving and loading fuel pellets formed of plutonium and/or reprocessed uranium compounds because of their toxic nature to preclude the release of radioactive contaminants to the atmosphere and to prevent overexposure to personnel.

In recent years, automated fuel pellet handling and loading systems have been developed to handle and transport the fuel pellets, cold components and cladding within fully enclosed fabrication and assembly stations without contaminating the area and personnel outside these enclosed assembly stations. Often, a number of fuel pellets and/or cold components in a juxtaposed end-to-end relation must be axially moved from one station to another during the assembly process prior to and during loading into the cladding. One serious problem in shifting these loosely assembled stacks axially is the application of excessive forces, such as might occur during pellet or cold component jamming or binding. Such forces not only damage the fuel pellets and cold components, but also can impair the associated equipment, resulting in expensive and time consuming repair as well as production down time.

Various two-part, disengageable electro-mechanical force sensing devices or mechanical snap-action arrangements are known for limiting the forces applied in a pushrod application. However, these known devices include moving parts susceptible to wear over a period of time with a resultant change in their force limiting settings, thereby aborting their intended purposes. Moreover, these two-component assemblies are difficult to re-engage after separation since they require a force to do so.

SUMMARY OF THE INVENTION

It is a primary object of the present invention to obviate the above noted shortcomings by providing a new and useful force limiting pushrod assembly offering greater reliability and repeatability than otherwise achieved by prior known force limiting pushrod arrangements.

It is another object of this invention to provide the foregoing pushrod assembly with a magnetic coupling automatically disengageable upon the application of a predetermined resistance load.

It is a further object of the present invention to provide a passive coupling arrangement readily disengageable upon the build up of a predetermined force and automatically re-engageable upon a decrease in such predetermined force.

These and other objects, advantages, and characterizing features of the present invention will become clearly apparent from the ensuing detailed description of an illustrated embodiment thereof, taken together with the accompanying drawings wherein like reference numerals denote like parts throughout the various views.

To achieve the foregoing and other objects and in accordance with the purposes of the present invention as embodied and broadly described herein, the apparatus of this invention may comprise a carriage reciprocally mounted on a shaft and carrying a pushrod thereon. A movable support bracket carrying a magnet also is mounted on the shaft, the magnet being spaced from said carriage to establish a selected, limiting magnetic force therebetween. Upon movement of the bracket, the magnet associated therewith pulls the carriage behind it until the selected magnetic force is exceeded.

BRIEF DESCRIPTION OF THE DRAWINGS

FIG. 3 is a cross-sectional view, taken along the line 3—3 of FIG. 1.

DESCRIPTION OF THE PREFERRED EMBODIMENT

Figure 1:
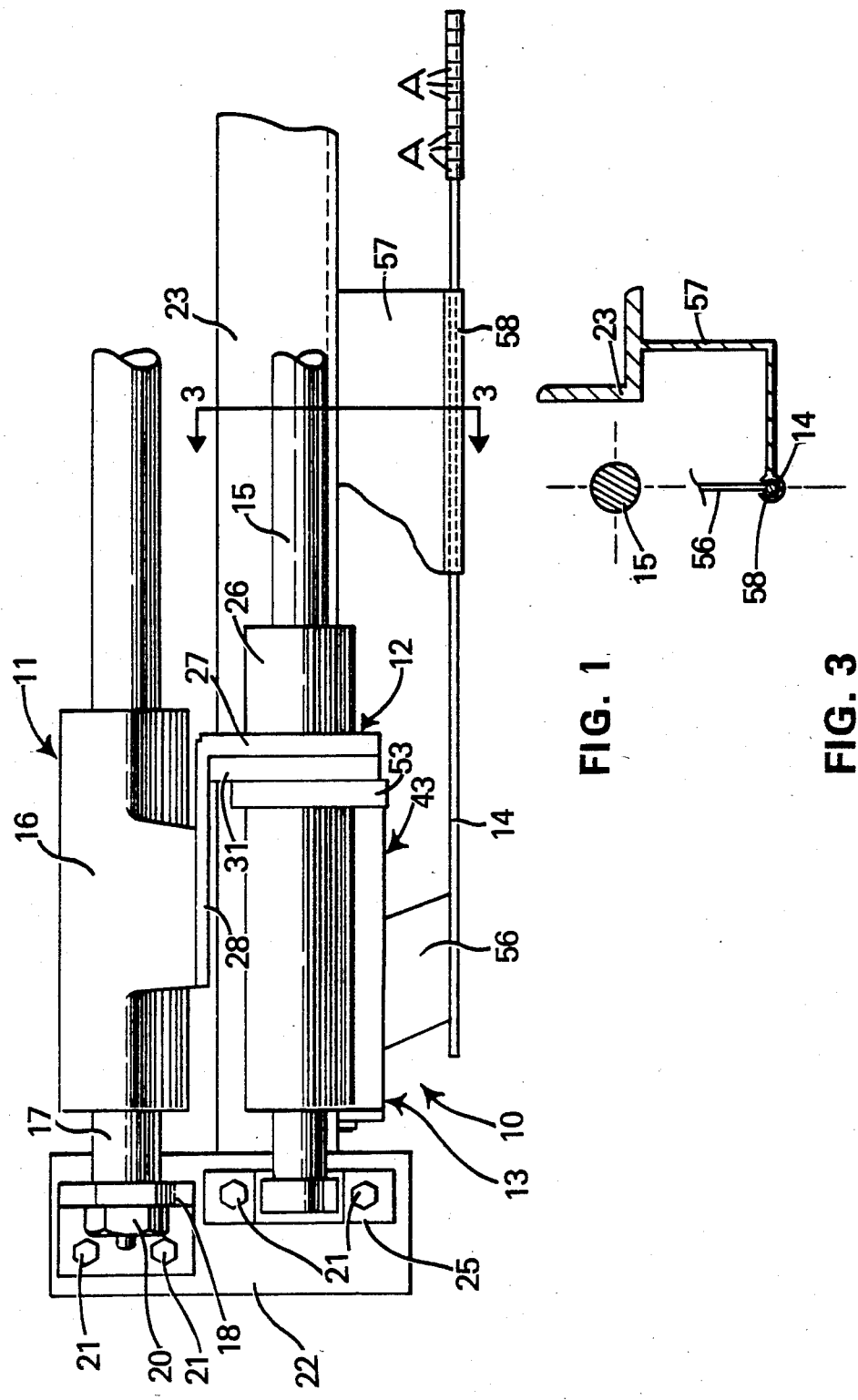
FIG. 1 is a fragmentary top plan view of a pushrod assembly constructed in accordance with this invention.

Referring now in detail to the illustrative embodiment depicted in the accompanying drawings, there is shown in FIG. 1 a pushrod assembly, comprehensively designated 10, generally comprising an actuator 11, a magnetic bracket assembly 12, and a carriage 13 supporting a pushrod 14. The bracket assembly 12 and the carriage 13 are mounted on a shaft 15 for reciprocal axial movement relative thereto. The assembly 10 comprises a part of an automated fuel fabrication system (not shown) and is adapted to transport a plurality of stacked end-to-end fuel pellets and/or cold components in an axial lengthwise or linear direction. The pellets and cold components can be disposed in a trough or the like to prevent lateral displacement while being shifted axially. Since the fuel fabrication system, per se, forms no part of this invention, no further amplification or description thereof is believed necessary. Suffice it to say that the entire system is contained within a contamination controlled atmosphere and that several assemblies 10 may be employed at various workstations within the system.

The actuator 11 preferably is in the form of a rodless cylinder assembly of the type manufactured by the Festo Corporation of Hauppauge, New York and includes a yoke 16 adapted to be reciprocated axially in a linear path along a rod 17 secured at its opposite ends (only one end is shown in FIG. 1) to a bracket 18 as by a retaining nut 20. The bracket 18, in turn, is rigidly secured, as by fasteners 21, to a cross member 22 welded or otherwise fixedly secured to a suitable framework comprised of a plurality of horizontally and longitudinally extending structural members 23, only one of which is shown in FIG. 1. The shaft 15 also is stationary and suitably mounted at its opposite ends in support brackets 25 secured by fasteners 21 to the cross member 22.

While the use of the rodless cylinder arrangement shown in the illustrative embodiment of this invention is preferable, it should be understood that any actuator capable of transmitting the desired reciprocal motion to the bracket assembly 12 can be used in lieu of the rodless cylinder assembly, if desired, within the purview of this invention.

Figure 2:
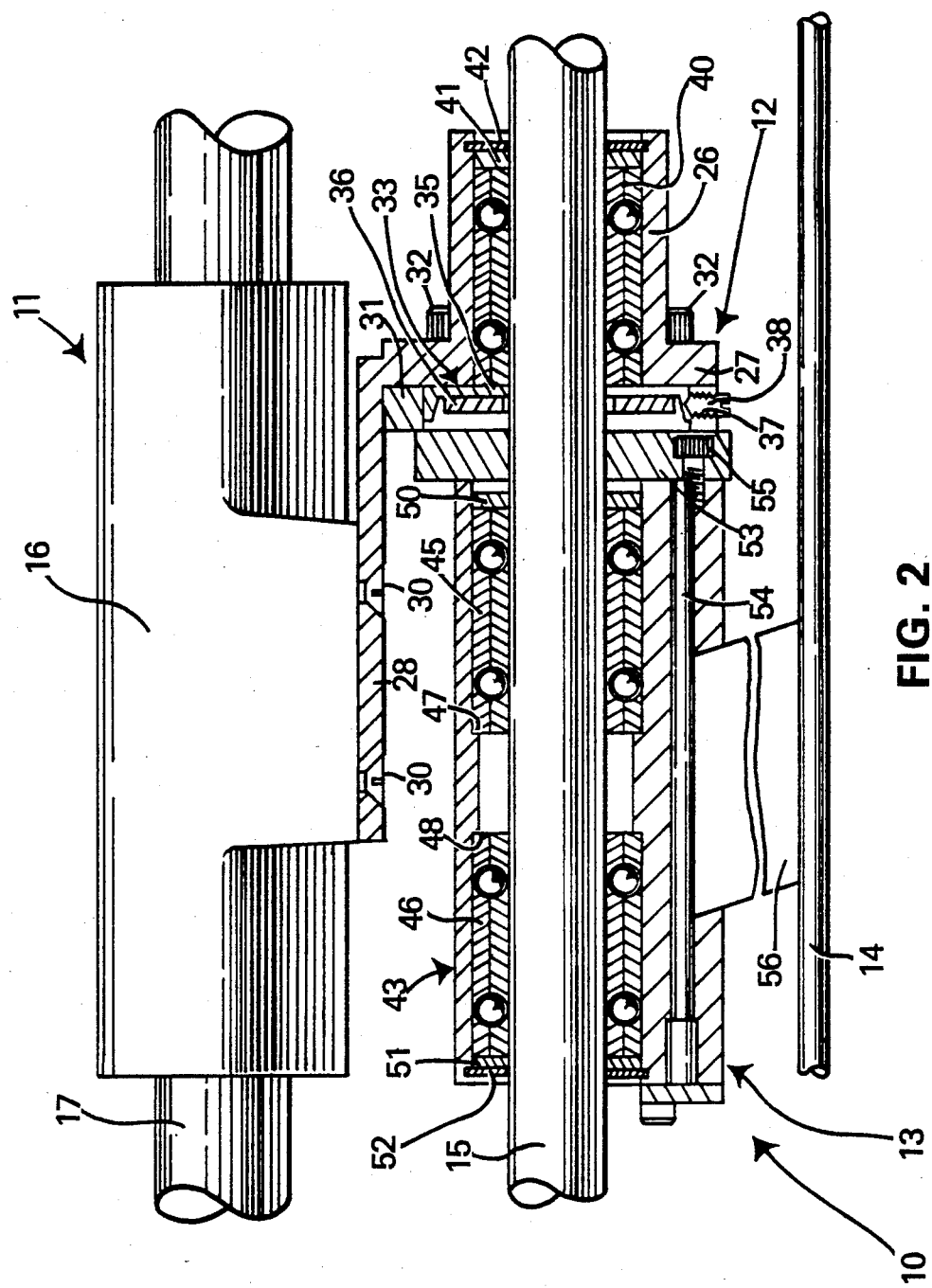
FIG. 2 is an enlarged fragmentary, longitudinal sectional view, partly in plan, of the pushrod assembly of FIG. 1.

The bracket assembly 12 comprises a generally cylindrical body portion 26 having an outturned flange 27 formed with a flattened, axially extending bracket 28, as shown in FIG. 2. The bracket 28 is secured by screw fasteners 30 to yoke 16 for reciprocal movement therewith. A retainer 31 is mounted to the inner face of flange 27 by a plurality of circumferentially spaced cap screws 32. The retainer 31 secures a magnet assembly 33 in place about the shaft 15, the assembly 33 including a shallow cup-shaped base member 35 for supporting a ceramic magnet 36 rigidly attached thereto. Two or more radial openings 37 are formed in the retainer 31 for receiving cone point set screws 38 adapted to engage opposite sides of the peripheral rim of base 35 to fixedly position the assembly 33 in place about shaft 15. The retainer 31 also serves as a spacer in providing an air gap or clearance between the magnet assembly 33 and carriage 13 as will hereinafter be more fully explained.

A ball bushing 40 is interposed between shaft 15 and body portion 26 to facilitate sliding movement of the latter relative to shaft 15. An annular seal 41 is provided adjacent the outer end of ball bushing 40 and is held in place by a suitable retaining ring 42. The base 35 and magnet 36 are formed with central openings to accommodate the shaft 15. Thus, actuation of the yoke 16 effects axial movement of the entire bracket assembly 12 relative to shaft 15.

Carriage 13 also is reciprocal along shaft 15 and includes a housing 43 encasing a pair of axially spaced ball bushings 45 and 46 seated against shoulders 47 and 48 formed in the inner wall surface of housing 43. The bushings 45 and 46 are provided with seals 50 and 51 and the outer seal 51 is held in place by a retaining ring 52. A pull plate 53, formed of mild steel, is secured to the inner end of housing 3 by a plurality of cap screws 55 (only one of which is shown in FIG. 2).

Housing 43 is provided with a support bracket 56 extending laterally therefrom and welded or otherwise fixedly secured to a rod 54 captively contained within the housing 43. The bracket 56 supports the elongated pushrod 14 adapted to engage and urge the articles, e.g. fuel pellets and/or cold components, in an axial direction. Means are provided for guiding the pushrod 14 in a straight, linear path, such means comprising an angle shaped support 57 secured at one end thereof to the structural member 23 and terminating at its other end in a tubular guide 58 of generally C-shaped configuration in cross section and complementary to the shape of the pushrod 14. The internal diameter of guide 58 is slightly larger than the outside diameter of pushrod 14 to permit free and easy reciprocal movement thereof within the guide 58.

The retainer 31 is precisely machined to a predetermined width for providing the desired clearance or air gap between magnet 36 and the carriage plate 53. This air gap determines the magnitude of the magnetic force or attraction between the magnet 36 and plate 53 and can be adjusted by selectively inserting retainers 31 of different widths therebetween. The magnetic force is inversely proportional to the width of the air gap and can vary from zero (maximum air gap) to a full magnetic force (zero gap) of about 30 pounds, for example. In lieu of spacers, non-magnetic adjustment screws, extending through plate 53 for engagement with flange 27, can be employed to determine the air gap and thereby the magnetic force, if desired. However, the spacer arrangement is preferable for greater reliablity and otherwise avoids the problem of loosening or wear associated with adjustment screws, which can adversely affect the force settings.

With the desired air gap set to establish the appropriate magnetic force, the operation of the pushrod assembly is as follows:

Actuation of the yoke 16 toward the right, as viewed in FIG. 1, effects movement of the bracket assembly 12 in the same direction. The bracket assembly 12 carries magnet 36 therewith which, by virtue of its magnetic attraction on the steel plate 53, serves as a coupling pulling the carriage 13 along behind it to move pushrod 14 towards the right. The pushrod 14, in turn, pushes the end-to-end stack of articles, e.g. fuel pellets and/or cold components, identified as A in FIG. 1, in an axial direction into a processing station or into the open end of a fuel pin cladding, for example.

In the event the articles jam-up or otherwise become obstructed while being moved, the resistance force acting against pushrod 14 will be increased. Should the resistance force exceed the magnetic force between magnet 36 and plate 53, the carriage 13 will become decoupled or left behind while bracket assembly 12 continues to move forwardly. Thus, excessive force buildup is prevented by virtue of the limited force setting established by the air gap and otherwise serious damage to the articles and/or associated equipment is avoided. When the direction of movement of the bracket assembly 12 is reversed on the back stroke, coupling of the carriage 13 to the bracket assembly 12 is automatically re-established for return of the carriage 13 therewith.

From the foregoing, it is apparent that the objects of the present invention have been fully accomplished. As a result of this invention, a magnetic pushrod assembly is provided for efficiently moving stacked articles in a linear path in a manner precluding excessive force build-up otherwise harmful to the articles being transported and/or to the article handling equipment. The magnetic linkage pushrod of this invention has no moving parts subject to wear, thereby providing greater reliability and repeatability in performance while materially prolonging the useful life of the pushrod apparatus.

While the apparatus of this invention has been described in connection with moving stacks of nuclear fuel pellets and/or the cold components associated therewith, it should be appreciated that the invention is not restricted thereto, but has utility in any article transport application where care must be exercised in limiting the forces applied to such articles.

The foregoing description of a preferred embodiment of this invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of this invention and its practical application to thereby enable others skilled in the art to utilize the invention in various embodiments and with various modifications as are suited to the particular use contemplated. It is intended that the scope of the invention be defined by the claims appended hereto.

I claim:

1. A pushrod assembly comprising: a frame, a shaft mounted on said frame, a carriage mounted on said shaft for reciprocal movement therealong, a pushrod mounted on said carriage and movable therewith for urging a load in a linear path, a magnet, means slidably mounted on said shaft for supporting said magnet, means for moving said supporting means, means for spacing said carriage from said magnet to establish a selected magnetic coupling force therebetween causing said carriage to follow said magnet upon movement of said supporting means away from said carriage, and means for adjusting the spacing between said magnet and said carriage for varying the magnetic coupling force therebetween, said carriage being decoupled from said supporting means upon encountering a resistance force exceeding said selected magnetic coupling force.

2. A pushrod assembly according to claim 1, including means on said frame for guiding said pushrod in a straight linear path.

3. A pushrod assembly according to claim 1, wherein said spacing means comprises a member mounted on said supporting means and having a predetermined thickness to provide a desired clearance between said carriage and said magnet.

4. A pushrod assembly according to claim 1, including a base member for rigidly supporting said magnet, and means releasably securing said base member on said supporting means.

5. A pushrod assembly according to claim 4, wherein said securing means comprises a retainer circumscribing said base member and provided with fastening means engageable with said base member.

6. A pushrod assembly according to claim 5, wherein said retainer is formed with a predetermined thickness to provide a desired clearance between said carriage and said magnet.

* * * * *